United States Patent [19]

Barnard

[11] Patent Number: 4,752,105
[45] Date of Patent: Jun. 21, 1988

[54] VEHICLE TRACTION

[76] Inventor: Jan H. Barnard, c/o P O Box 3272, Pretoria, 0001, Transvaal Province, South Africa

[21] Appl. No.: 40,765

[22] Filed: Apr. 14, 1987

Related U.S. Application Data

[63] Continuation of Ser. No. 791,115, Oct. 24, 1985, abandoned.

[51] Int. Cl.$^4$ .............................................. B62D 55/24
[52] U.S. Cl. ..................................... 305/38; 152/175; 152/187; 152/191; 152/220; 180/9.1; 305/40; 305/45
[58] Field of Search ..................... 180/9.1; 305/38, 40, 305/45; 152/220, 187, 175, 191

[56] References Cited

U.S. PATENT DOCUMENTS

| | | | |
|---|---|---|---|
| 1,397,314 | 11/1921 | Cox | 305/40 |
| 2,063,762 | 12/1936 | Schultz | 305/40 |
| 2,305,072 | 12/1942 | Fetters | 280/28.5 |
| 2,325,690 | 8/1943 | Le Guillon | 305/38 |
| 2,402,042 | 6/1946 | Haushalter | 305/37 |
| 2,412,122 | 12/1946 | Campbell | 305/38 |
| 2,541,177 | 2/1951 | Slemmons | 305/38 X |
| 2,917,347 | 12/1959 | REuter et al. | 305/38 |
| 2,998,998 | 9/1961 | Hyler et al. | 180/9.1 X |
| 3,063,758 | 11/1962 | Fikse | 305/40 |
| 3,210,133 | 10/1965 | Swanson | 305/35 EB |
| 3,345,113 | 10/1967 | Siber | 305/14 |
| 3,346,306 | 10/1967 | Siber | 305/40 |
| 3,703,321 | 11/1972 | Schoonover | 305/38 |

FOREIGN PATENT DOCUMENTS

| | | |
|---|---|---|
| 1480789 | 6/1969 | Fed. Rep. of Germany . |
| 742412 | 3/1933 | France . |
| 8502826 | 7/1985 | PCT Int'l Appl. . |
| 1105560 | 3/1968 | United Kingdom ................. 305/40 |
| 676488 | 7/1979 | U.S.S.R. ................................ 305/38 |

OTHER PUBLICATIONS

Wolfgang Trautwein; "Tank Hangs by Thread—Loop-wheel Looks Good as Track Replacement", Dec. 6, 1979–Machine Design, pp. 132, 133.

Primary Examiner—David M. Mitchell
Assistant Examiner—Mitchell J. Hill
Attorney, Agent, or Firm—Browdy and Neimark

[57] ABSTRACT

A resiliently flexible endless articulated track member for a vehicle includes a series of transverse track elements held together bead-fashion in abutting relationship under compression by a plurality of tensile core elements under tension. The said track elements are of taper section defined by taper sides which converge inwardly of the tensile core element to permit resilient flexing of the track member around a drive or guide wheel. Adjacent transverse track elements have pressure faces disposed outwardly of the tensile core element, the said pressure faces being adapted in use to abut against each other, to limit reverse bending of the track member under load. The tensile core elements are in the form of endless steel wire ropes, accommodated in seats defined by resilient seat members. The track elements are made up of inner and outer parts. Clamp members are provided to clamp the inner and outer parts and their resilient seat members together, around the tensile core elements.

9 Claims, 6 Drawing Sheets

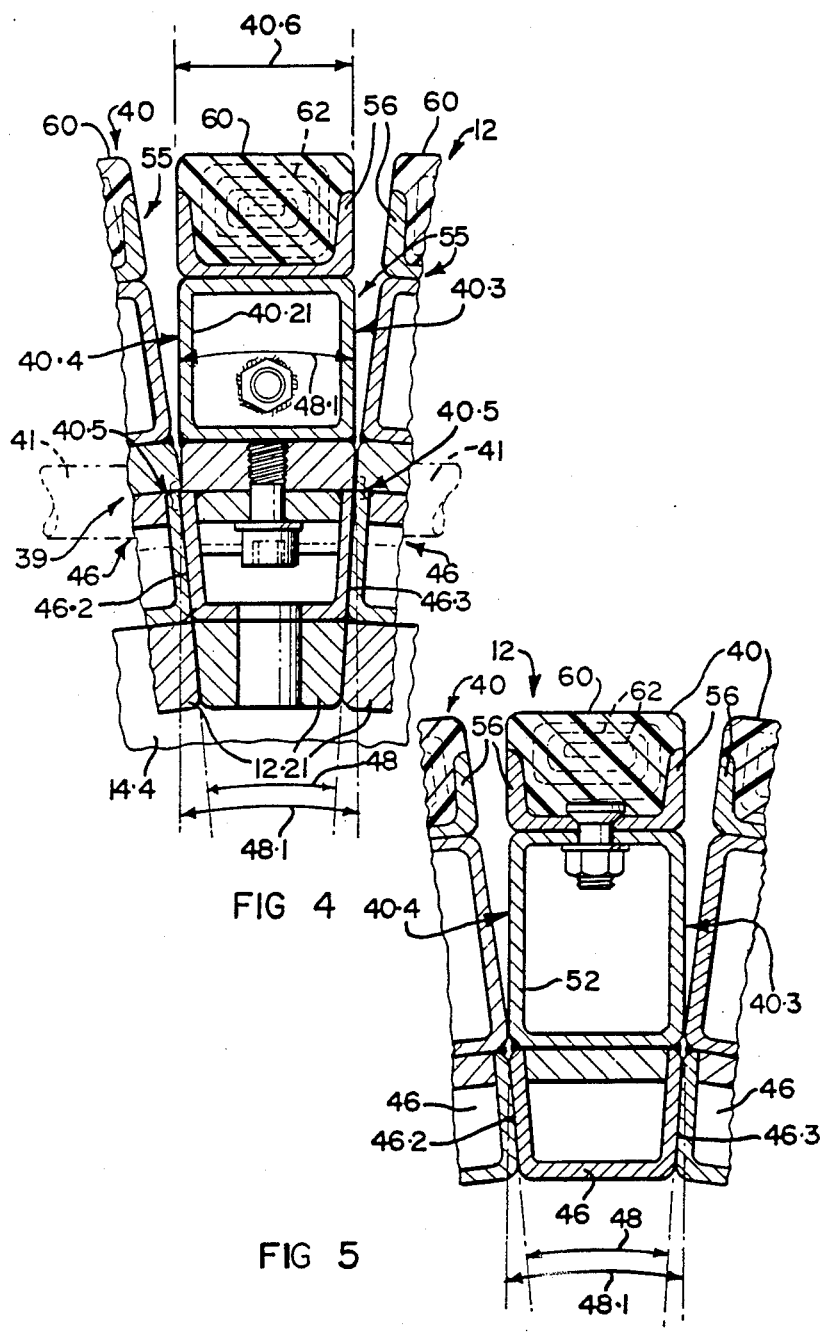

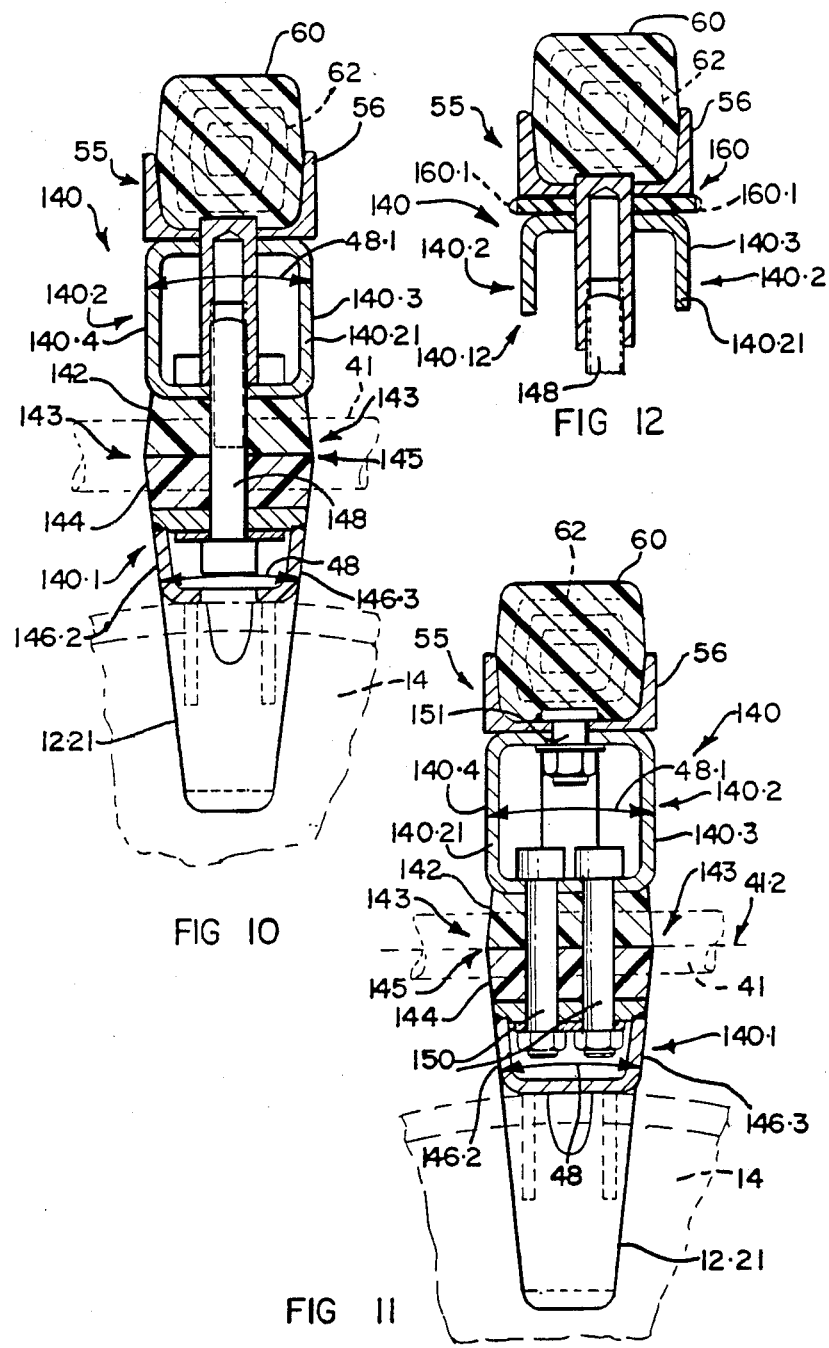

VEHICLE TRACTION

This application is a continuation of application Ser. No. 791,115, filed Oct. 24, 1985, now abandoned.

FIELD TO THE INVENTION

This invention relates to vehicle traction. It relates in particular to an endless track for providing driving contact with a supporting surface. The traction provided by tractor drive wheels in loose soil, is limited by the diameter of the drive wheels and by the degree of compaction of the soil under the wheels of the tractor. It has been calculated that the power available at the draw-bar of a tractor is only about one-third of the power output of the engine when the tractor is running on loose soil, such as a ploughed field.

BACKGROUND TO THE INVENTION

Endless tracks of which the Applicant is aware, make us of elements or links strung bead-fashion on tensile, core elements. The Applicant is also aware of a track which includes a cable-reinforced flexible belt to which transverse track elements are attached.

It is an object of this invention to provide a novel endless track, providing good traction for a vehicle or tractor.

SUMMARY OF THE INVENTION

Accordingly, the invention provides a resiliently flexible articulated track member for a vehicle, and which includes a series of transverse track elements held together bead-fashion in abutting relationship under compression by at least one tensile core element under tension, the said track elements having a taper section defined by taper sides which converge inwardly of the tensile core element to permit resilient flexing of the track member around a drive or guide wheel, adjacent track elements having pressure faces disposed outwardly of the tensile core element, the said pressure faces being adapted in use to abut against each other, to limit reverse bending of the track member under load.

The said pressure faces can be arranged to act in use to prevent reverse bending of the track member under load.

The said pressure faces of the track elements may also converge inwardly. The degree of convergence of the said pressure faces may be less than the degree of convergence of the said taper sides. The included angle defined by the said pressure faces of a track element may lie within the range of one-quarter degree to one-third degree. The included angle defined by the taper sides of a track element may lie within the range of five to eight degrees. These taper sides lend a substantially wedge shape appearance to the track elements in side elevation or cross-section and permit the track member to curve as it passes around the wheels.

The track member may have a plurality of tensile core elements spaced in series across its width. The core elements may be in the form of endless steel wire ropes.

The track elements may be made up of inner and outer parts which are disposed inwardly and outwardly respectively of the tensile core element(s), the said inner and outer parts abutting along longitudinal faces in the region of the longitudinal axis of the tensile core element. The inner parts have the taper faces and the outer parts have the pressure faces.

The track elements may include resilient seat members having resilient seats for the tensile core element, and clamp means for clamping the inner and outer parts and the resilient seat members together around the tensile core elements. The clamp means cause the resilient seat members to be under radial compression around the core element and under axial compression between adjacent transverse track elements. The compression of the said resilient seat members can be adjusted to permit a limited degree of conformable deflection of the track member under load. By 'conformable deflection of the track member' is meant deflection of the track member to conform substantially to the surface with which it engages.

The invention extends also to a method of placing the track elements of a track member as described under tensile load, which includes increasing the clamping action of the clamp means around the resilient members to cause them to expand Poisson-fashion, thereby increasing the abutting pressure between adjacent track elements.

A track element may include a resilient cushion in its outer part, outwardly from its resilient seat member, and outer clamp means to clamp the cushion to cause it to expand Poisson-fashion to abut in use against similar cushions of adjacent track elements at regions radially outwardly from the tensile core elements.

The invention extends also to an endless track vehicle which includes a pair of endless track members as described, spaced laterally and having drive surfaces along their inner peripheries;

a pair of laterally spaced rear drive wheels engaging with the drive surfaces of the said track members;

a pair of laterally spaced front wheels, also engaging with the drive surfaces of the said track members;

adjustment means to increase and decrease the wheel base between the rear and front wheels; and an engine or motor for driving the drive wheels.

Different embodiments of the invention will now be described by way of example with reference to the accompanying diagrammatic drawings.

DESCRIPTION OF THE DRAWINGS

In the drawings,

FIG. 4 shows a part-sectional elevation at IV—IV in FIG. 3;

FIG. 5 shows a part-sectional elevation at V—V in FIG. 3;

FIG. 10 shows a cross-section at X—X in FIG. 9;

FIG. 11 shows a cross-section at XI—XI in FIG. 9; and

FIG. 12 shows a view similar to that of FIGS. 10 and 11, of a variation in construction of the track member shown there.

Referring to FIGS. 1 and 2 of the drawings, reference numeral 10 refers generally to a vehicle in accordance with the invention, having two transversely spaced endless articulated track members 12 mounted on pneumatic drive wheels 14 and pneumatic deflecting or tensioning or guide wheels 16. The track members 12 have transversely spaced friction faces 12.1 (see FIG. 3) adapted to co-operate and engage frictionally with the outer surfaces 14.1 and 16.1 (see FIGS. 1 and 2) of the wheels 14 and 16 respectively. The track members 12 have central locating ridges 12.2 which in use seat snugly in grooves or passages 14.2 or 16.2 in the outer peripheries of wheels 14 and 16, or between double wheels 14.3 and 14.4. Where single wheels are used, outer locating ridges (not shown) may be provided for bearing against the sides of the wheel at its periphery.

Figure 7:
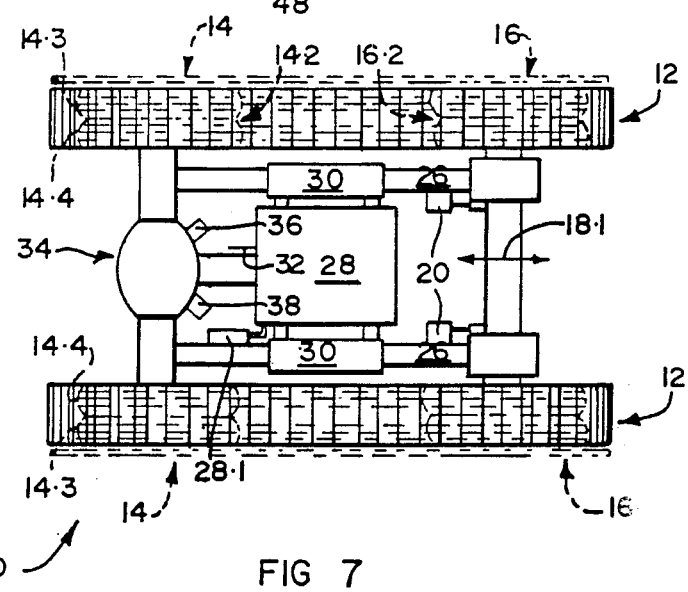
FIG. 7 shows a plan view of the lower part of the vehicle shown in FIG. 1.

The length of the wheel base 18, between the drive wheels 14 and deflecting wheels 16, is adjustable in the direction of arrow 18.1 by means of adjusting means 20 (see FIG. 7). The deflecting wheels 16 have cross-heads 22, slidable along slide faces 24 provided at the end of transversely spaced longitudinal members 26 extending between drive wheels 14 and deflecting wheels 16. The wheel base 18 of the vehicle is greater than the combined radii of the wheels 14 and 16, so that the wheels can rotate inside the track member, without interfering with each other. The wheels may be pressure-charged wheels such as pneumatic wheels with friction driving surfaces engaged by the track member. The pressure-charged wheel may include a casing such as a rubber tire charged under pressure with air, polyurethane, or water, or combinations thereof. For brevity, the term 'pneumatic wheel' used in this specification is intended to include a pressure-charged wheel, whatever the filler material used for charging an outer casing.

The vehicle 10 has a prime mover in the form of an engine 28, mounted on a slide 30, slidable along the longitudinal members 26. This permits the longitudinal position of the engine 28 to be adjusted relative to the rotational axes of the drive and deflecting wheels 14 and 16. This permits adjustment of the position of the centre of mass of the vehicle without the addition of extra mass. A telescopically extensible and retractable propeller shaft 32 is provided between the engine 28 and the differential system 34 of the drive wheels 14. Separate motors 36 and 38 are provided for braking one or other of the drive wheels 14, or causing them to rotate at different speeds in the same direction of rotation, or even in opposite directions. This is for manoeuvering purposes.

Figure 3:
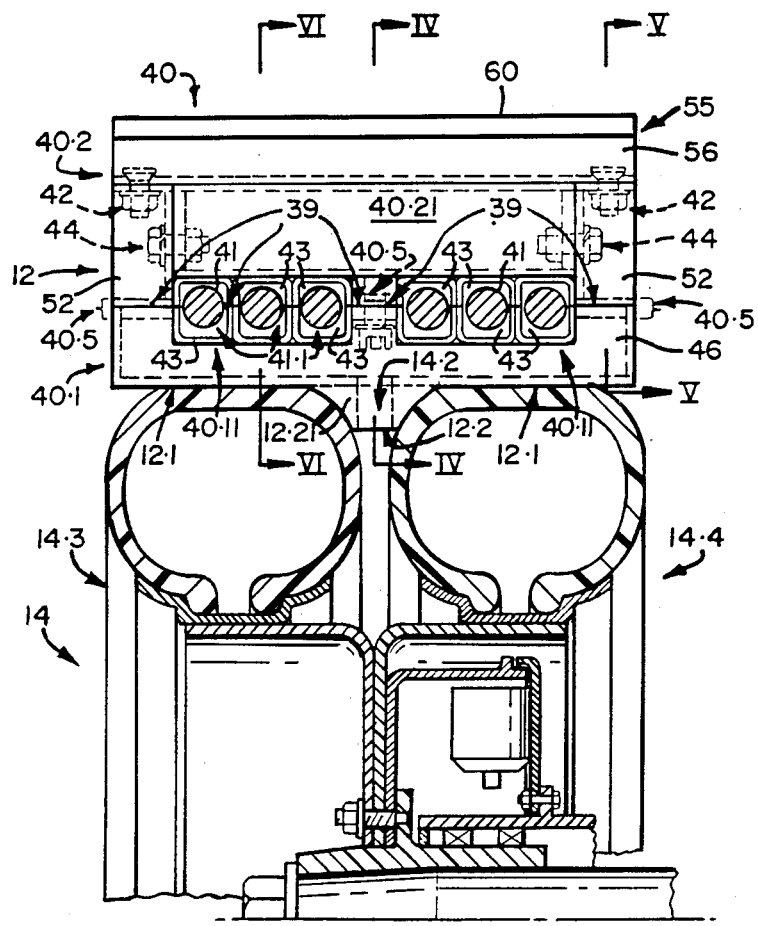
FIG. 3 shows a part cross-section at III—III in FIG. 2, but to a larger scale, for a heavy-duty application using double wheels.
Figure 6:
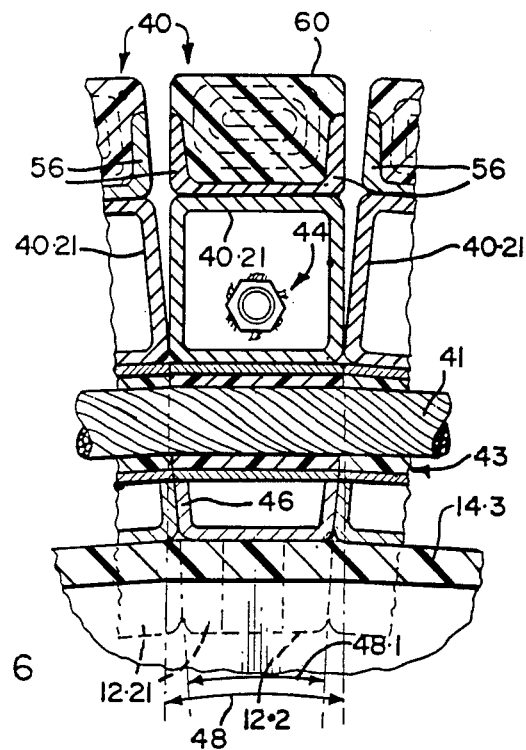
FIG. 6 shows a part-sectional elevation at VI—VI in FIG. 3.

The endless articulated track member 12 will now be described in greater detail. It includes a series of transverse track elements 40 having a high modulus of elasticity, held together bead-fashion in abutting relationship by a plurality of endless tensile core elements 41 under tension, spaced in series across the width of the track member 12, and seating in resilient seats 41.1 of resilient seat members 43 in the track elements 40. The tensile core elements 41 are in the form of steel wire ropes. A track element 40 includes a transverse bar which is preferably made of steel sections which are welded together to form inner and outer parts 40.1 and 40.2 respectively, (see FIG. 3) which are disposed inwardly and outwardly respectively of the tensile core elements 41. The said parts 40.1 and 40.2 abut along faces 39 in the region of the longitudinal axes of the tensile core elements. The said faces 39 of a series of track elements 40 are generally aligned in a longitudinal direction, i.e., in the direction of the axes of the tensile elements 41. The parts 40.1 and 40.2 are held together around the tensile core elements 41 by clamp means in the form of bolts 42 and 44. The inward projections 12.21 forming part of the inner parts 40.1 together make up the locating ridges 12.2 of the track members 12.

Referring particularly to FIGS. 2 to 6 of the drawings, there is shown a track element 40 made up of the inner part 40.1 to which is clamped an outer part 40.2 by means of radial bolts 42 and transverse bolts 44. The inner part 40.1 has a part 46 of substantially channel section having taper sides 46.2 and 46.3 (see FIGS. 4 and 5) which converge inwardly and define an acute angle 48 of between five and eight degrees. The outer parts 40.2 have pressure faces 40.3 and 40.4 which also converge inwardly, but the taper is less, having an included angle 48.1 of between one-quarter degree to one-third degree. The inner part 40.1 has seats in the form of central recessed regions 40.11, replaceably to receive synthetic plastics material resilient seat members 43 having the resilient seats 41.1 for the steel wire ropes 41. The resilient seat members 43 are held in position between the inner part 40.1 and the outer part 40.2 by the outer part 40.2 having a central pedestal portion 40.21 fitting over the resilient seat members 43 in between outer pedestal portions 52 of the inner part 40.1, and effectively locating resilient seat members 43, providing the seats 41.1 to the steel wire ropes 41. The seat members 43 are of resilient elastomeric material, such as polyurethane, or rubber having a Shore hardness of 85 to 95, and abut along faces 39.

A holder, generally indicated by reference numeral 55, and forming part of the outer part 40.2, includes a channel 56 secured to the pedestal portion 40.21. A transverse soil surface-engaging element in the form of a resilient pad 60 of rubber is chemically bonded to the inner surface of the channel 56. The pad 60 is reinforced with laminated iron or steel mesh 62. Enamelled steel or iron wire mesh or netting of BWG32×14×14 is considered suitable for use as reinforcement 62. The pad 60 is formed by layers of mesh 62 and rubber being rolled up into a roll which is then moulded under pressure and heat into the channel 56, thereby bonding the rubber to the inner surface of the channel 56. The layer of rubber may have a thickness of between 1 mm and 6 mm. The moulding pressure and temperature may lie within the regions of 13,000 kPa and 140° C. The rubber expected to give the best results is carboxylated nitrile rubber for this application. Because of the high elastic modulus of steel, it is believed that a rubber having a relatively low Shore A hardness of 60 will give good results with regard to surface adhesion.

The zones 40.5 disposed radially inwardly and radially outwardly of the neutral axes of the tensile core elements and of the abutting faces 39, along the length of the transverse track elements 40, may be case-hardened or may have hard inserts to provide high resistance against abrasive wear. It is at these regions that relative movement may take place as the track member 12 flexes and articulates in passing around the wheels 14 and 16, or in passing over obstacles. The hardened steel may be in the form of an epsilon iron nitride case which may also be blackened by being immersed subsequently in a special salt bath for rust proofing by Kolene's quench polish quench process. The hardness of the steel case may be of the order of 60 to 64 Rockwell C.

In assembly, the inner parts 40.1 of the various track elements 40 are arranged next to one another around longitudinally spaced wheels 14 and 16 which can be urged apart so as to place an elastic tensile pre-load on the tensile core elements 41 seating within the seats 41.1.

Thereupon, the outer parts 40.2 are pressed firmly onto the tensile core elements 41 to cause them to seat snugly in the resilient seats 41.1. Thereupon, the parts 40.1 and 40.2 are bolted together by means of the bolts 42 and 44. The thickness of one track element 40, less the circumferential free space between the second last and third last track elements, amounts to the required elongation of the core elements 41 to give the necessary tensile pre-load on the track elements 40 when the core elements 41 are stretched for insertion of the last transverse track element 40 in the assembly making up a full track member 12.

Figure 1:
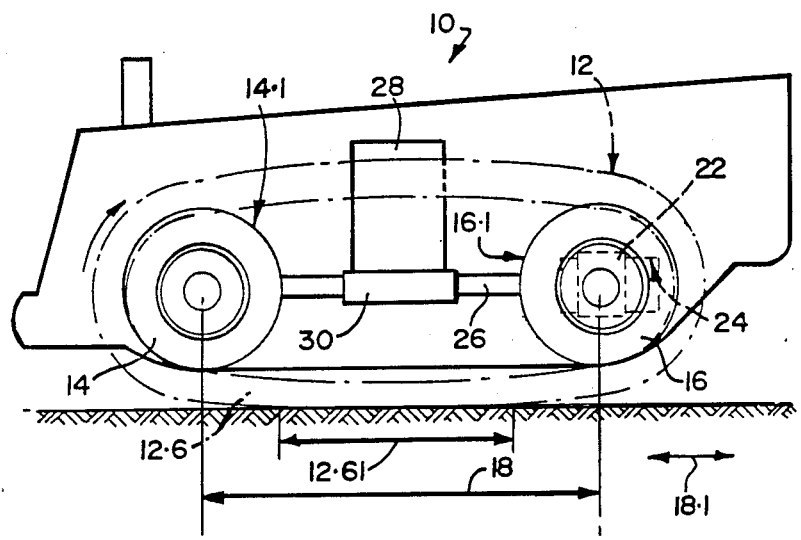
FIG. 1 shows a general side view of a vehicle in accordance with the invention, when lightly loaded, and incorporating a pair of endless articulated track members and pneumatic drive and tensioning wheels.
Figure 2:
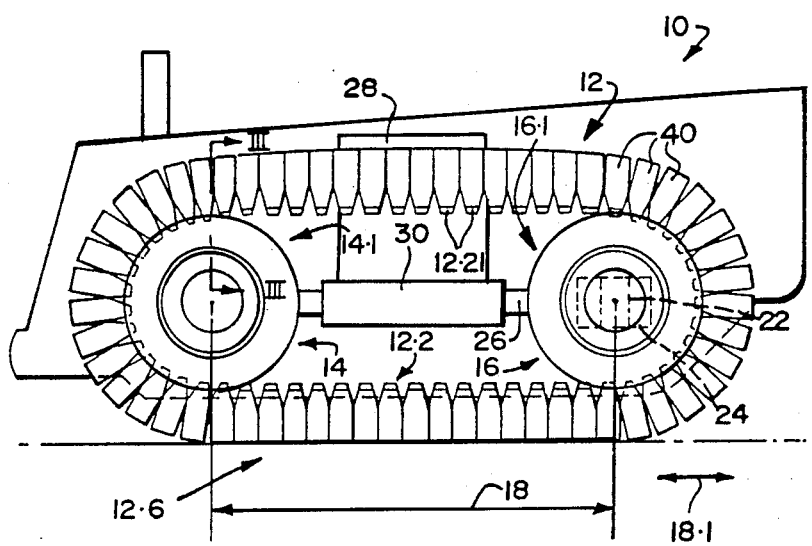
FIG. 2 shows another side view of the vehicle of FIG. 1 wheel under load, and showing the endless track member in greater detail.

All the various track elements 40 are fitted closely together while the tensile core elements 41 have been under elastic pre-load. The endless track member 12 because of the wedge shape in cross-section of the track elements 40, can assume a generally circular shape. When mounted on the wheels 14 and 16, and when the wheels are urged apart, then the track member 12 will assume a generally oval shape, as indicated in FIGS. 1 and 2 of the drawings.

The inner parts of the pneumatic wheels 14 and 16 may be of substantially the same construction as that used on heavy vehicles.

Figure 8:
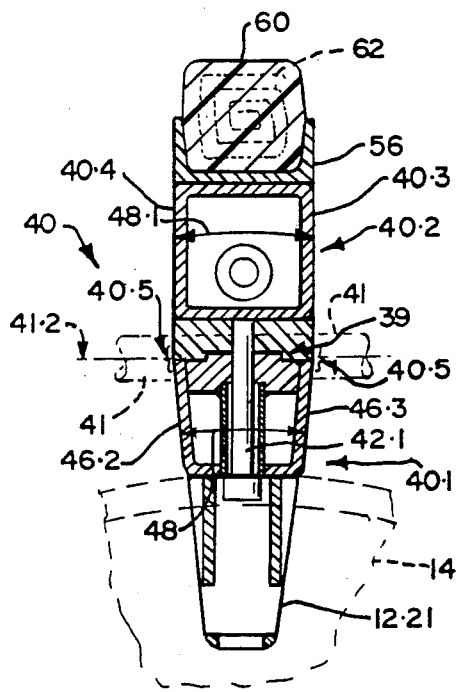
FIG. 8 shows a cross-section midway through a transverse track element for one type of track member.

Referring now to FIG. 8 of the drawings, there is shown a transverse track element of somewhat different construction to that shown in FIGS. 3 to 6 of the drawings. The inner and outer parts 40.1 and 40.2 respectively fit together spigot and socket fashion along abutting faces 39 at the region of the neutral axis 41.2 of the tensile core elements 41. Track elements according to FIG. 8 will also have hardened zones 40.5 or hard inserts at these zones, as already described.

The high elastic modulus of steel parts 40.1 and 40.2 ensures that little deflection of the track members 12 will take place under high pre-load conditions of the ropes 41. The transverse inner and outer parts 40.1 and 40.2 are accurately made with regard to dimensions in the longitudinal direction of the ropes 41, and also with regard to the rocking or hinge surfaces 40.5. The ropes 41 are relatively widely spaced to ensure that deflection in the horizontal plane is limited to a minimum under transverse forces. The ropes are so arranged that their longitudinal axes coincide with the neutral axis 41.2 during bending and pass through the rocking or hinge axis between adjacent abutting track elements 40. The movement between the contact surfaces between adjacent elements 40 is limited so that they can hinge equally freely when they pass around the drive and deflecting wheels 14 and 16. Equal hinge movement by each track element 40 ensures equal articulation around the wheels.

The adjusting means 20 is provided for adjusting the wheel base 18 between the longitudinally spaced fore and aft pneumatic wheels 14 and 16, so as to ensure good frictional contact between the frictional drive faces 12.1 of the track members 12 and the wheels 14 and 16. When the endless articulated track members 12 are mounted on two sets of wheels 14 and 16 which are urged apart to a desired wheel base 18, they take on a generally oval shape when seen in side elevation. The bottom spans of the track members 12 engaging with the ground have a radius of curvature which is dependent on the degree of taper of the pressure faces 40.3 and 40.4 of the track elements. When the track member 12 is under load, it may have, for heavy traction applications, a generally asymmetrical oval shape in side elevation about an axis intersecting the rotational axes of the two sets of wheels 14 and 16.

The track member 12 is so made that the contact portion on the ground under full load can be regarded as practically a solid beam having some resilience and possibility of deflection. Limited hinge movement and pre-load result in an articulated oval wheel having a deflecting wheel 16 in front and a driving wheel 14 at the back. Under light loading, that part 12.61 of the endless track of the bottom span 12.6 which contacts the ground, is slightly curved, as can be seen in FIG. 1, having a radius of curvature of several metres. Under maximum loading, it can be designed to become a solid straight beam (as seen in FIG. 2). It is not contemplated that any additional carrying wheels between the drive wheels 14 and the deflecting wheels 16 will be needed. The thickness 40.6 of a track element 40, at its outer periphery remote from the core elements 41, is slightly more, say, ½ mm to 1 mm more, than the corresponding thickness across the rocking or hinge surfaces 40.5.

The oval wheel can provide an arcuate contact surface with the ground, which is substantially greater than that which is obtainable with ordinary round pneumatic tires. Indeed, the contact area of the oval wheel can be equivalent to a round wheel of several metres diameter. The tension in the tensile core element may be so high in use that under no load or under a light load the ground-engaging bottom span of the track member has a bottom outer surface of bow or convex shape in side elevation, and that under increasing load it gradually straightens and its convexity is reduced.

Figure 9:
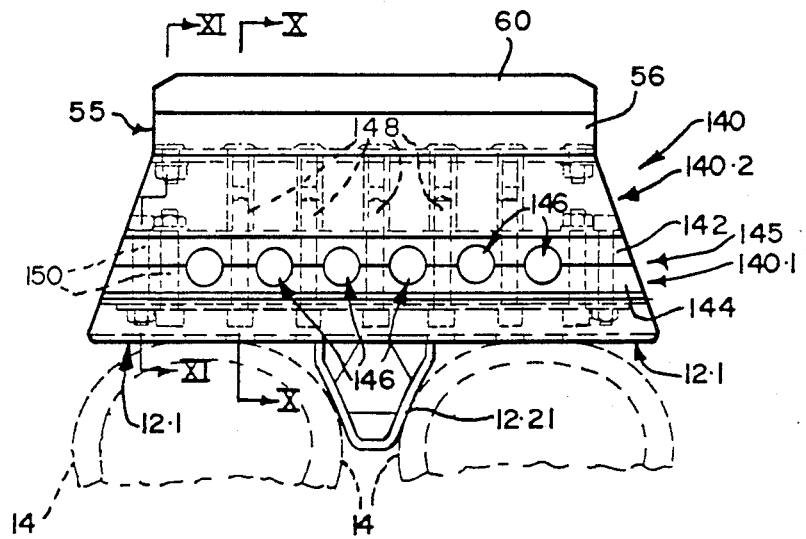
FIG. 9 shows a front elevation of a transverse track element for another type of track member.

Referring now to FIGS. 9 to 11 of the drawings, there is shown a transverse track element 140 permitting adjustability in the resilience and flexibility of a track member 12 made up of such elements 140. An element 140 is itself made up of inner and outer parts 140.1 and 140.2 respectively. The construction is generally similar to that described with reference to FIG. 8, except that the ropes are clamped by a pair of resilient seat members 142 and 144 which extend the width of the track member and which form part of the inner and outer parts 140.1 and 140.2. The seat members 142 and 144 have cylindrical seats 146 to accommodate the tensile core elements (ropes) 41. The inner and outer parts 140.1 and 140.2 and resilient seat members 142 and 144 are securely held together around the ropes 41 by means of set screws 148 and bolts 150. The seat members 142 and 144 abut along a face 145 and are under sufficient compression to bulge Poisson-fashion axially relative to the cylindrical recessed seats 146, as shown in FIG. 9. The screws 148 and the bolts 150 are disposed transversely to the longitudinal abutting face 145. The resilient material used for the seat members 142 and 144 has a Shore A hardness of between 85 and 95. The seat members 142 and 144 are bonded to form part of the inner and outer parts 140.1 and 140.2. The resilient material preferred is polyurethane. The abutting face 145 corresponds to the abutting faces 39 of the embodiments of track elements shown in FIGS. 3 and 8. The taper sides 146.2 and 146.3 of the embodiment of track element 140 of FIGS. 10 and 11 correspond to the taper sides 46.2 and 46.3 of the track element 40 and have the same included angle. Likewise, the pressure faces 140.3 and 140.4 of the track element 140 correspond to the pressure faces 40.3 and 40.4 of the track element 40 and have the same included angle.

In assembly, the inner and outer parts 140.1 and 140.2 are clamped over the ropes 41, and the screws 148 and bolts 150 are tightened. The extent to which the screws 148 and bolts 150 are tightened determines the extent of tensile preload on the ropes 41. Thus, some adjustment in the degree of flexibility and resilience of the track member is obtained.

In use, track members 12, made up of transverse track elements 140, can have adjustable flexibility because of the resilient seat members 142 and 144, and the screws 148 and bolts 150. In the track member 12, the elements 140 will have the Poisson bulges 143 compressed in the longitudinal direction of the ropes 41. The resilient clamping of the ropes 41 by the seat members 142 and 144 of the elements 140 permits greater tilting of the elements 140 relative to the longitudinal axes of the ropes 41 than is possible with the solid clamping of the elements 40.

Referring now to FIG. 12 of the drawings, there is shown a variation in construction of the track element 140. The outer part 140.2 of track element 140 is made up of an outer member in the form of the holder 55 which includes channel 56 bolted to an inner member in the form of a box section 140.21 by set screws 148 (FIG. 10) and by bolts 150 and 151 (FIG. 11). The variation of FIG. 12 includes the provision of a resilient cushion 160 of a few millimetres thick between the web of the channel 56 and the radially outer surface of the box section 140.21. The cushion 160 may be of polyurethane of the same grade and quality as the resilient seat members 142 and 144. By suitably tightening the set screws 148 and the nuts of the bolts 151, the cushion 160 may be compressed to varying degrees. The extent to which the cushion 160 will expand laterally Poisson fashion in a direction transversely to its thickness, can thus be varied. The lateral expansion is indicated in dotted lines 160.1. Such lateral Poisson expansions of adjacent track elements 140.12 can also be used to preload the ropes 41, by abutting against each other. Such resilient abutment can also provide sufficient resilience to permit a reverse bending of the track member 12 to a limited extent. This cushion 160 may have a thickness lying within the range 3 to 10 mm, and may have a width, when uncompressed, of one or two mm wider than the width of the web of the channel 56. The degree to which the cushion 160 is compressed by the screws 148 and 151 depends upon the extent to which the ropes 41 are to be preloaded and upon the extent to which the cushions 160 of adjacent track elements 140.12 are to expand laterally Poisson fashion, as indicated in dotted lines 160.1 in FIG. 12.

Flexibility of the track member permits a limited degree of conformable deflection, thereby permitting track members 12 to pass over protrusions or uneven terrain without exerting undue pressure on such protrusions. A vehicle having track members with track elements 140 or 140.12 can be adjusted to have a softer or more resilient ride than a vehicle having track members with track elements 40. The pressure exerted on protrusions can be about 100 kPa or even as low as 60 kPa.

In operation, while travelling under light load, the vehicle as shown in FIG. 1 and 2, could rear up and take up an inclined posture by the leading wheel pair 16 being slightly higher than the drive wheel pair 14 at the back. This will permit easy steering because of the relatively small contact area between the track members and the ground. As the load (including draw-bar pull) on the vehicle increases, so the contacting area will increase, thereby providing greater adhesion between the track members and the ground. At this time also, it may be convenient to shift the centre of mass of the vehicle forward by moving the engine forwardly relative to the wheel axes.

I claim:

1. A resilient flexible endless articulated track member for a vehicle and which includes a series of transverse track elements assembled to and held together bead-fashion in abutting relationship under compression by at least one endless tensile core element, each track element comprising inner and outer parts having inner and outer resilient seat members of elastomeric material having recessed defining seats to accommodate the tensile core element and clamp means for clamping the inner and outer parts and their inner and outer resilient seat members firmly together around the tensile core element, the inner and outer resilient seat members of adjacent transverse track elements, in use under such clamping expanding Poisson-fashion longitudinally relative to the tensile core element, thereby placing the tensile core element under a tensile load.

2. A track member as claimed in claim 1 in which the clamp means for each track element includes bolts or set screws on either side of the tensile core element, holding the resilient seat members under compression around the tensile core element.

3. A track member as claimed in claim 1, which has a plurality of tensile core elements spaced across the width of the track member, in which the resilient seat members of each transverse track element have recess sets for the tensile core elements spaced transversely across the width of the track member, and in which the clamp means includes screw fastening elements on either side of each of the tensile core elements, holding the resilient seat members under compression around the tensile core element.

4. A track member as claimed in claim 3, in which the inner and outer resilient seat members of each transverse track element extend across the width of the track member.

5. A track member as claimed in claim 1, in which each of the said track elements, has a resilient cushion in its outer part, outwardly from its resilient seat member, and outer clamp means to clamp the said cushion to cause it to expand Poisson-fashion to abut in use against similar cushions of adjacent track elements at regions radially outwardly from the tensile core elements.

6. A track member as claimed in claim 1, in which the Shore A hardness of the resilient seat members of the transverse track elements lies in the range 85 to 95.

7. A track member as claimed in claim 1, in which the resilient seat members are of polyurethane bonded to the inner and outer parts of the transverse track element.

8. A track member as claimed in claim 5, in which the resilient cushion in the outer part of a track element, is in the form of a slab of uniform thickness, and in which the outer clamp means includes screw fastening elements passing through the resilient cushion.

9. A track member as claimed in claim 8, in which the said resilient cushion has a Shore A hardness in the range 85 to 95.

* * * * *